US006845442B1

(12) United States Patent
Lepak et al.

(10) Patent No.: US 6,845,442 B1
(45) Date of Patent: Jan. 18, 2005

(54) SYSTEM AND METHOD OF USING SPECULATIVE OPERAND SOURCES IN ORDER TO SPECULATIVELY BYPASS LOAD-STORE OPERATIONS

(75) Inventors: Kevin Michael Lepak, Madison, WI (US); Benjamin Thomas Sander, Austin, TX (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 438 days.

(21) Appl. No.: 10/135,497

(22) Filed: Apr. 30, 2002

(51) Int. Cl.[7] .............................................. G06F 9/38
(52) U.S. Cl. ..................................... 712/214; 712/225
(58) Field of Search ............................... 712/214, 215, 712/225

(56) References Cited

U.S. PATENT DOCUMENTS

| 5,428,807 A | | 6/1995 | McKeen et al. ............ 712/216 |
| 5,452,426 A | | 9/1995 | Papworth et al. ........... 712/217 |
| 5,584,009 A | * | 12/1996 | Garibay et al. ............. 711/117 |
| 5,778,219 A | * | 7/1998 | Amerson et al. ............ 712/244 |
| 5,781,752 A | | 7/1998 | Moshovos et al. .......... 712/216 |
| 6,065,103 A | | 5/2000 | Tran et al. ................... 711/156 |
| 6,108,770 A | | 8/2000 | Chrysos et al. ............. 712/216 |
| 6,112,296 A | * | 8/2000 | Witt et al. ................... 712/222 |
| 6,175,910 B1 | | 1/2001 | Pauporte et al. ............ 712/217 |
| 6,237,082 B1 | * | 5/2001 | Witt et al. ................... 712/215 |
| 6,249,862 B1 | | 6/2001 | Chinnakonda et al. ...... 712/218 |
| 6,463,580 B1 | | 10/2002 | Wilkerson ................... 707/149 |
| 6,643,767 B1 | * | 11/2003 | Sato ............................ 712/219 |

FOREIGN PATENT DOCUMENTS

WO            01/35212            5/2001

OTHER PUBLICATIONS

Thomas, et al., "Using Dataflow Based Context for Accurate Value Prediction," ECE Dept., Univ. of Maryland, 11 pages.
Kim, et al., "Implementing Optimizations at Decode Time," Dept. of Electrical and Computer Engineering, Univ. of Wisconsin–Madison, 12 pages.

Onder, et al., "Load and store Reuse Using Register File Contents," Dept. of Computer Science, Michigan Technological Univ., 14 pages.

Moshovos, et al., "Streamlining Inter–operation Memory Communication via Data Dependence Predication," Computer Sciences Dept., Univ. of Wisconsin–Madison, Dec. 1–3, 1997, 11 pages.

Reinman, et al, "Classifying Load and Store Instructions for Memory Renaming," Dept of Computer Science and Engineering, Univ. of California, San Diego, Proceedings of the International Conference on Supercomputing, Jun. 1999, 10 pages.

Andreas Moshovos, et al., "Memory Dependence Prediction in Multimedia Applications," Northwestern University and University of Wisconsin–Madison, 18 pages.

Stephan Jourdan, et al., "A Novel Renaming Scheme to Exploit Value Temporal Locality Through Physical Register Reuse and Unification," Intel Corporation, IEEE, 1998, 10 pages.

Michael Bekerman, et al., "Early Load Address Resolution Via Register Tracking," Intel Corporation, 9 pages.

International Search Report for PCT/US 02/41716 mailed Aug. 18, 2003, 6 pages.

* cited by examiner

Primary Examiner—Eric Coleman
(74) Attorney, Agent, or Firm—Robert C. Kowert; Meyertons, Hood, Kivlin, Kowert & Goetzel, P.C.

(57) ABSTRACT

A system may include a scheduler and an execution core. The scheduler includes an entry allocated to an operation. The entry includes a non-speculative tag and a speculative tag, and both the non-speculative tag and the speculative tag are associated with a first operand of the operation. The scheduler is configured to issue the operation in response to a data value identified by the speculative tag being available. The execution core may be configured to execute the operation using the data value identified by the speculative tag. The scheduler may be configured to reissue the operation if the non-speculative tag appears on a result bus.

33 Claims, 10 Drawing Sheets

SYSTEM AND METHOD OF USING SPECULATIVE OPERAND SOURCES IN ORDER TO SPECULATIVELY BYPASS LOAD-STORE OPERATIONS

BACKGROUND OF THE INVENTION

1. Field of the Invention

This invention is related to the field of microprocessors, and more particularly, to performing data-speculative execution in a microprocessor.

2. Description of the Related Art

Superscalar microprocessors achieve high performance by executing multiple instructions concurrently and by using the shortest possible clock cycle consistent with their design. However, data and control flow dependencies between instructions may limit how many instructions may be issued at any given time. As a result, some microprocessors support speculative execution in order to achieve additional performance gains.

One type of speculation is control flow speculation. Control flow speculation predicts the direction in which program control will proceed. For example, branch prediction may be used to predict whether a branch will be taken. Many types of branch prediction are available, ranging from methods that simply make the same prediction each time to those that maintain sophisticated histories of the previous branches in the program in order to make a history-based prediction. Branch prediction may be facilitated through hardware optimizations, compiler optimizations, or both. Based on the prediction provided by the branch prediction mechanism, instructions may be speculatively fetched and executed. When the branch instruction is finally evaluated, the branch prediction can be verified. If the prediction was incorrect, any instructions that were speculatively executed based on the incorrect predication may be quashed.

Another type of speculation that has been proposed is data speculation. For example, value prediction, which predicts the value of data items, may involve observing patterns in data and basing the prediction on those patterns (e.g., an index counter variable's value may be predicted by observing how prior values of that variable are incremented or decremented). Address prediction involves predicting the location of data. Yet another type of data speculation is called memory system optimism. In multi-processor systems, memory system optimism occurs when a processor speculatively executes an instruction using data from that processor's local cache before coherency checking is complete. Similarly, another type of data speculation may allow a load to speculatively execute before a store that has an uncomputed address at the time the load executes, even though the store may store data to the same address that the load accesses. In all of these types of data speculation, the underlying conditions are eventually evaluated, allowing the speculation to be verified or undone. If the speculation ends up being incorrect, the instructions that executed using the speculative data may be re-executed (e.g., with updated and/or non-speculative data).

Since speculation allows execution to proceed without waiting for dependency checking to complete, significant performance gains may be achieved if the performance gained from correct speculations exceeds the performance lost to incorrect speculations. Accordingly, it is desirable to be able to perform data speculation in a microprocessor and to provide an efficient recovery mechanism for misspeculations.

SUMMARY

Various embodiments of methods and systems for using speculative operand sources may be implemented. In one embodiment, a system may include a scheduler and an execution core. The scheduler includes an entry allocated to an operation. The entry includes a non-speculative tag and a speculative tag, and both the non-speculative tag and the speculative tag are associated with a first operand of the operation. The scheduler is configured to issue the operation in response to a data value identified by the speculative tag being available. The execution core may be configured to execute the operation using the data value identified by the speculative tag. The scheduler may be configured to reissue the operation if the non-speculative tag appears on a result bus.

In another embodiment, a microprocessor may include a non-speculative register map, a speculative register map, and a scheduler. The non-speculative register map may be configured to provide a non-speculative operand tag for a first source operand of an operation. The speculative register map may be configured to provide a speculative operand tag for the first source operand of the operation. The scheduler includes an entry allocated to the operation. The entry includes the speculative operand tag and the non-speculative operand tag for the operand, and the scheduler is configured to issue the operation for execution using the speculative operand tag.

One embodiment of a method may involve mapping a first source operand of an operation to a non-speculative operand tag, speculatively mapping the first source operand of the operation to a speculative operand tag, storing the non-speculative operand tag and the speculative operand tag in a scheduler entry allocated to the operation, issuing the first operation in response to availability of a first data value identified by the speculative operand tag, and executing the first operation using the first data value identified by the speculative operand tag instead of using a second data value identified by the non-speculative operand tag.

In another embodiment, a method may involve issuing an operation in response to availability of a first data value identified by a speculative operand tag, executing the operation using the first data value instead of using a second data value identified by a non-speculative operand tag, and broadcasting the non-speculative operand tag on a result bus. In response to the non-speculative operand tag being broadcast on the result bus, the operation may be reissued and executed using the second data value identified by the non-speculative operand tag.

BRIEF DESCRIPTION OF THE DRAWINGS

A better understanding of the present invention can be obtained when the following detailed description is considered in conjunction with the following drawings, in which.

Figure 1:
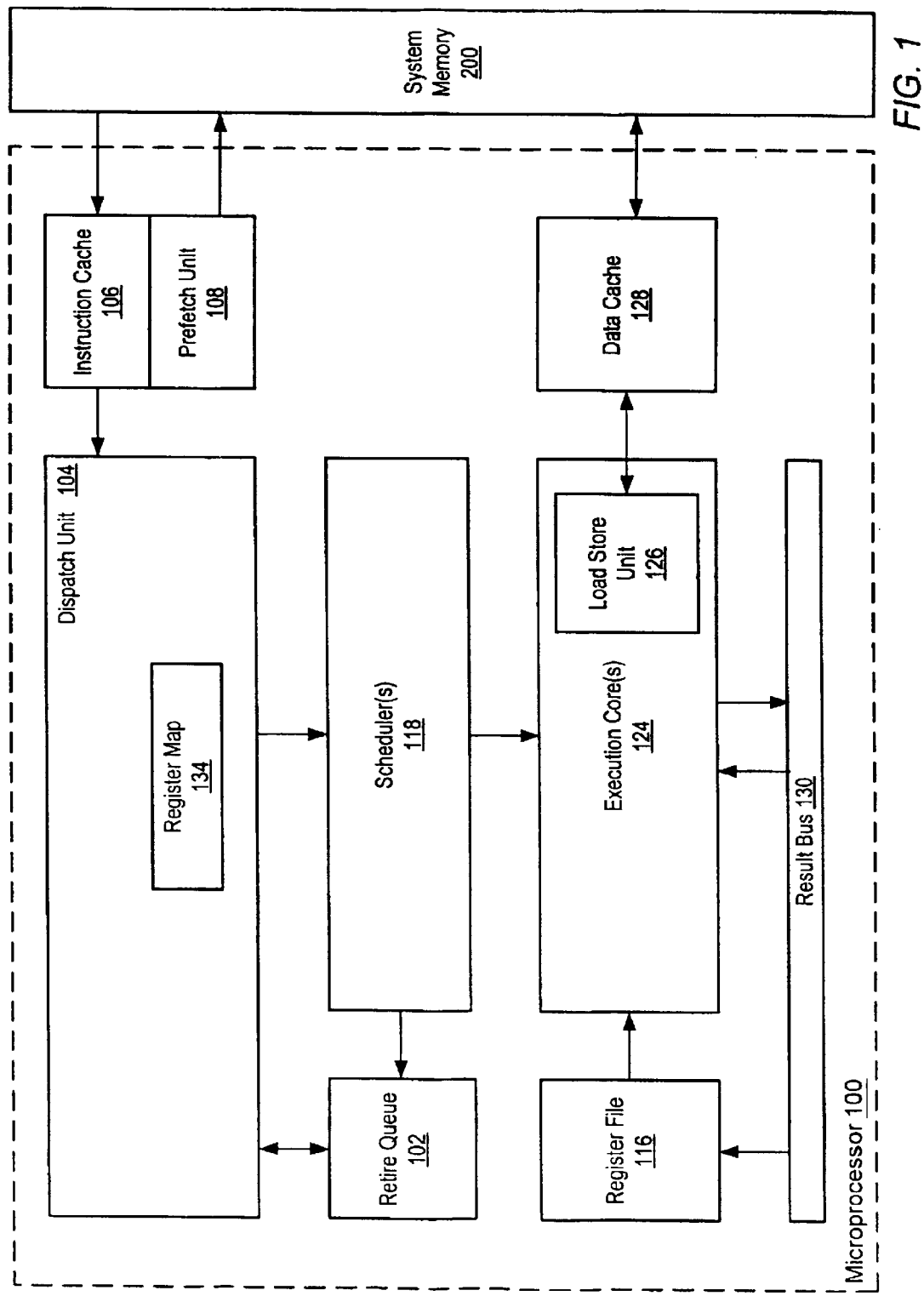
FIG. 1 shows one embodiment of a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of one embodiment of a microprocessor 100. Microprocessor 100 is configured to execute instructions stored in a system memory 200. Many of these instructions operate on data stored in system memory 200. Note that system memory 200 may be physically distributed throughout a computer system and may be accessed by one or more microprocessors 100.

Microprocessor 100 may include an instruction cache 106 and a data cache 128. Microprocessor 100 may include a prefetch unit 108 coupled to the instruction cache 106. A dispatch unit 104 may be configured to receive instructions from instruction cache 106 and to dispatch operations to scheduler(s) 118. One or more schedulers 118 may be coupled to receive dispatched operations from dispatch unit 104 and to issue operations to one or more execution cores 124. Execution core(s) 124 may include a load/store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired. In one embodiment, the microprocessor 100 may be designed to be compatible with the x86 architecture. Note that microprocessor 100 may also include many other components. For example, microprocessor 100 may include a branch prediction unit (not shown).

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms.

Dispatch unit 104 may output signals including bit-encoded operations executable by the execution core(s) 124 as well as operand address information, immediate data and/or displacement data. In some embodiments, dispatch unit 104 may include decoding circuitry (not shown) for decoding certain instructions into operations executable within execution core(s) 124. Simple instructions may correspond to a single operation. In some embodiments, more complex instructions may correspond to multiple operations. Upon decode of an operation that involves the update of a register, a register location within register file 116 may be reserved to store speculative register states (in an alternative embodiment, a reorder buffer may be used to store one or more speculative register states for each register). A register map 134 may translate logical register names of source and destination operands to physical register names in order to facilitate register renaming. Register map 134 may track which registers within register file 116 are currently allocated and unallocated.

The microprocessor 100 of FIG. 1 supports out of order execution. A retire queue 102 may keep track of the original program sequence for register read and write operations, allow for speculative instruction execution and branch misprediction recovery, and facilitate precise exceptions. In some embodiments, retire queue 102 may. also support register renaming by providing data value storage for speculative register states. In many embodiments, retire queue 102 may function similarly to a reorder buffer. However, unlike a typical reorder buffer, retire queue 102 may not provide any data value storage. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to register map 134 indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Upon decode of a particular operation, if a required operand is a register location, register address information may be routed to register map 134 (or a reorder buffer). For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation which, upon decode, is determined to modify the contents of one of the logical registers. Therefore, at various points during execution of a particular program, register file 116 (or, in alternative embodiments, a reorder buffer) may have one or more registers that contain the speculatively executed contents of a given logical register.

Register map 134 may assign a physical register to a particular logical register specified as a destination operand for an operation. Dispatch unit 104 may determine that register file 116 has one or more previously allocated physical registers assigned to a logical register specified as a source operand in a given operation. The register map 134 may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 118) through load/store unit 222. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence. Operations that involve data speculation may remain in scheduler(s) 118 until they become non-speculative so that they may be reissued if the data speculation is incorrect In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load/store unit 126.

The execution core(s) 124 may also provide information regarding the execution of conditional branch instructions to a branch prediction unit so that if the branch was mispredicted, the branch prediction unit may flush instructions subsequent to the mispredicted branch that have entered the instruction processing pipeline and redirect prefetch unit 106. The redirected prefetch unit 106 may then begin fetching the correct set of instructions from instruction cache 106 or system memory 200. In such situations, the results of instructions in the original program sequence that occurred after the mispredicted branch instruction may be discarded, including those which were speculatively executed and temporarily stored in register file 116. Results produced by components within execution core(s) 124 may be output on the result bus 130 to the register file 116 if a register value is being updated. If the contents of a memory location are being changed, the results produced within execution core(s) 124 may be provided to the load/store unit 126.

Load/store unit 126 provides an interface between execution core(s) 124 and data cache 128. In one embodiment, load/store unit 126 may be configured with a load/store buffer with several storage locations for data and address information for pending loads or stores. The load/store unit 126 may also perform dependency checking for load instructions against pending store instructions to ensure that data coherency is maintained.

Data cache 128 is a cache memory provided to temporarily store data being transferred between load/store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Figures 2A, 2B:
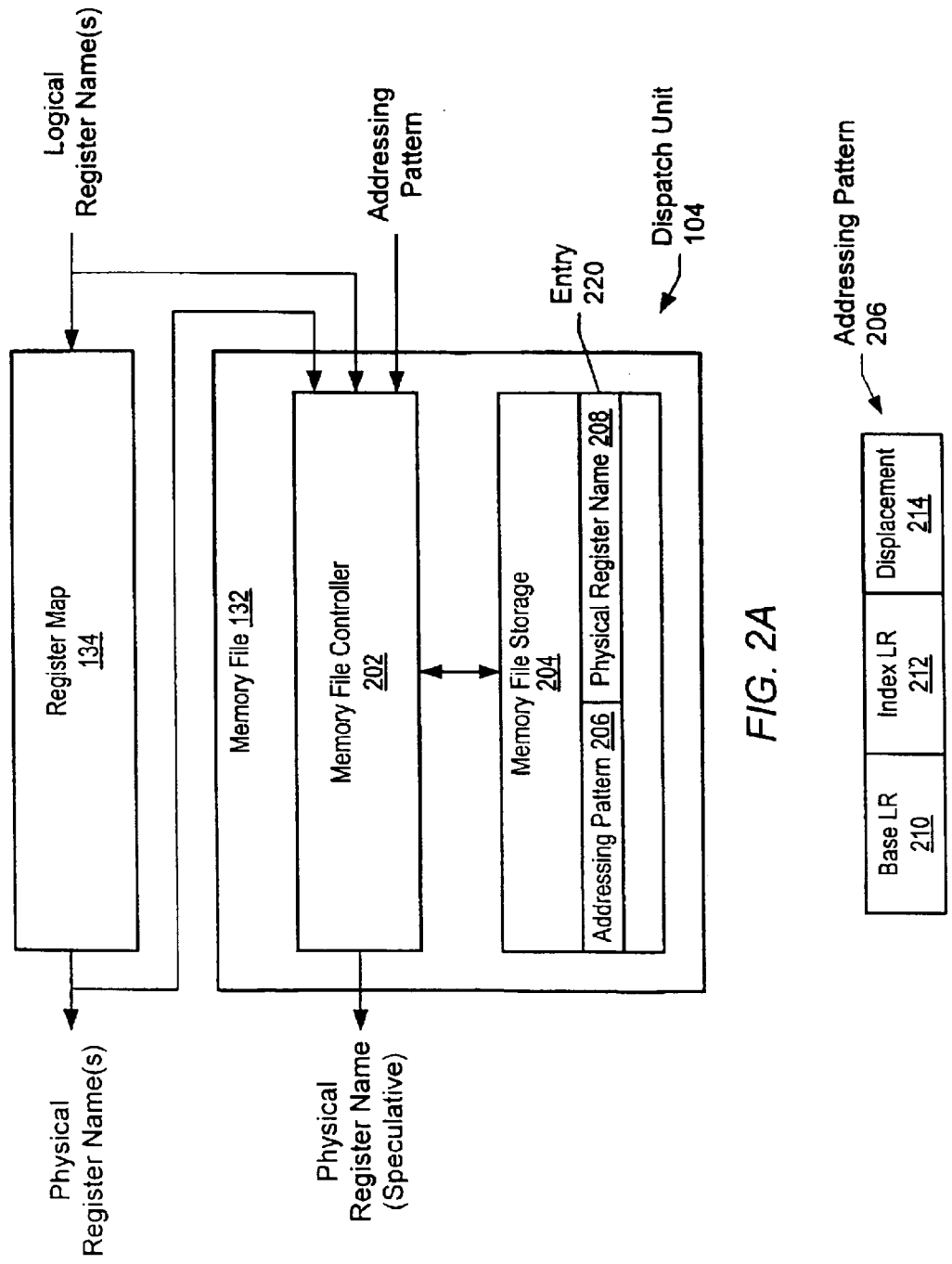
FIG. 2A is a block diagram of one embodiment of a dispatch unit.
FIG. 2B shows an exemplary memory file storage entry that may be used in one embodiment.

FIG. 2A shows one embodiment of a dispatch unit 104. In this embodiment, dispatch unit 104 includes a register map 134 and a memory file 132. As mentioned above, register map 134 may be configured to provide register renaming. Register map 134 may receive logical register names for each source and destination operand and output the physical register names of the physical registers most recently assigned to the logical registers. Memory file 132 includes a memory file controller 202 and memory file storage 204.

Memory file storage 204 includes one or more entries 220. Each entry 220 may include an addressing pattern 206 and a tag 208 associated with that entry's addressing pattern. Each tag may identify a data value by indicating where that data value will be stored (e.g., within a reorder buffer or within a register file 116) when it is generated. For example, as shown in the illustrated embodiment, each tag may identify the physical register allocated to store that data value, as indicated by register map 134. Each addressing pattern may include all or some of the information used to specify an address in an operation. For example, looking quickly at FIG. 2B, an exemplary addressing pattern 206 is shown. In this embodiment, the addressing pattern 206 includes a base logical register name 210, an index logical register name 212, and a displacement 214. Some addressing patterns 206 may include a segment portion used to identify a particular segment in memory. Note that in many embodiments, the addressing pattern. 206 stored in memory file storage 204 may include less than all of the addressing information specified for an operation. For example, entries in memory file storage 204 may store fewer than all of the bits used to specify a displacement within displacement field 214. Memory file storage 204 may be implemented from several registers, latches, flip-flops, or other clocked storage in some embodiments. In alternative embodiments, memory file storage 204 may include one or more RAM (Random Access Memory) cells.

Memory file controller 202 may compare the addressing patterns specified in undispatched operations to those stored within entries in memory file storage 204. If an operation's addressing pattern does not match any of the addressing patterns currently stored within entries in memory file storage 204 (i.e., the operation's addressing pattern misses in the memory file storage), memory file controller 202 may allocate a new entry in memory file storage 204 to store all or some of that operation's addressing pattern. If there are no free entries to allocate within memory file storage 204, memory file controller 202 may select an entry to overwrite using a replacement scheme such as LRU (Least Recently Used), FIFO (First In, First Out), random replacement, etc. In addition to storing the operation's addressing pattern within the allocated entry, the memory file controller 202 may also store the a tag (e.g., the name of the physical register) identifying a value being loaded from or stored into the memory location identified by that operation's addressing pattern. For example, if an operation that loads data from memory is being handled, the entry allocated in response to that operation may store the name of the physical register allocated to store the result of the load operation. If an operation that stores data to a memory location is being handled, memory file controller 202 may store the physical register name of the register storing the value being stored by the store operation in memory file storage 204.

If an operation's addressing pattern (or a portion of that pattern) is already stored an entry in memory file 204 (i.e., the operation's addressing pattern hits in the memory file storage), the memory file controller 202 may use or modify the entry containing the matching addressing pattern. If a load operation (an operation that loads a value from a particular address into a register) is being handled, the memory file controller 202 may output the physical register name 208 stored in the matching entry. If a store operation (an operation that stores a value from a register to a particular address) is being handled, the memory file controller 202 may overwrite the tag (e.g., physical register name 208) stored in the matching entry with the tag of the data being stored.

If a load operation is being handled and the load operation hits in the memory file storage 204, the tag output by the memory file controller 202 may be used to link the value stored identified by the tag to a speculative result of the load operation. For example, in some embodiments, when the load operation is dispatched to scheduler(s) 118, the tag output by memory file 132 may also be provided to the scheduler(s) (e.g., as a speculative source operand tag). A scheduler 118 may issue the operation in response to the availability (e.g., in register file 116 or on result bus 130) of the value identified by that tag. An execution core 124 may execute the load operation so that the linked value is broadcast as the speculative result of the load operation on result bus 130 (note that the data value produced as the load's result may not itself be flagged or otherwise identified as a speculative value in some embodiments). In other embodiments, the data value may be linked to the speculative result of the load operation by storing the tag in a speculative map, as described below.

As a result of the link, the data value identified by the tag may be forwarded as the speculative result of the load once the data value is available (e.g., in register file 116 or on result bus 130) in order to allow dependent operations to execute using the speculative result. In many cases, this may allow dependent operations to execute using the speculative result of the load operation sooner than they could if their execution is delayed until the non-speculative result of the load operation becomes available. In some embodiments, the data value may be forwarded by executing the load operation so that the data value is output onto the result bus 130 as the speculative result of the load operation. For example, in one embodiment, instead of taking three cycles to perform the load non-speculatively (assuming the load hit in the data cache 128), the load may be executed in a single cycle by outputting the data value and a tag identifying the data value as the load result. In other embodiments, the data value may be forwarded in a more indirect manner by providing the tag output by memory file controller 202 directly to dependent operations (operations having an operand produced by the load operation) as a speculative operand source at dispatch. Means for forwarding the data value may include one or more of: a dispatch unit configured to modify the load operation to execute as a speculative register-to-register move operation or to provide the tag to a dependent operation as a speculative operand source tag, a scheduler configured to issue the modified load and/or the dependent operation dependent on the availability of the linked data value, and an execution core configured to output the linked data value as the result of the load or to execute the dependent operation using the linked data value.

The load store unit 126 (or another means for verifying the speculative link within microprocessor 100) may verify the speculative link of the value stored in the physical register identified by memory file 132 to the result of the load operation. If the speculative link is incorrect, the load store unit 126 may cause the load to be reissued and/or broadcast the correct result of the load operation on result bus 130. Reissuing the load may cause any dependent operations that executed using the speculative result of the load to reissue and execute using the updated, non-speculative value.

As shown, memory file 132 tracks the addressing patterns in operations that access data in data cache 128 (or system memory 200). As a result, register values stored in physical registers may be linked to values stored in particular addresses in memory.

In order to further illustrate the operation of memory file 132, assume that a sequence of operations to be handled by dispatch unit 104 includes the following operations:

| | |
|---|---|
| MOV EBX, [EDX+EAX−displacement A] | (LOAD 1) |
| . . . | |
| MOV ECX, [EDX+EAX−displacement A] | (LOAD 2) |
| . . . | |
| MOV [EDX+EAX−displacement A], EAX | (STORE 1). |

Each of these operations may be separated by one or more intervening operations in program order. As shown, each of these three operations includes the same addressing pattern, EDX+EAX−displacement A.

When LOAD 1's addressing pattern is provided to memory file 132, memory file controller 202 may check memory file storage 204 for an addressing pattern that matches LOAD 1's addressing pattern. Assuming that the addressing pattern misses in the memory file storage 204, the memory file controller 202 may allocate an entry (either by using an unallocated entry or by overwriting an already allocated entry) to store all or some of the addressing pattern of the load operation and the physical register name of the load operation's destination physical register as provided by register map 134. Since the load operation misses in the memory file storage, the memory file controller 202 may not output a tag for that load operation.

When LOAD 2 is subsequently handled by memory file 132, its addressing pattern may match the addressing pattern in the entry allocated in response to LOAD 1 (assuming LOAD 1's entry has not been already been overwritten in response to an intervening operation). In response to LOAD 2's addressing pattern hitting in memory file storage 204, memory file controller 202 may output the physical register name of the physical register allocated to store the result of LOAD 1. This physical register name may be used to link the data value loaded by LOAD 1 to the speculative result of LOAD 2.

When STORE 1 is handled by memory file 132, its addressing pattern may hit in the entry allocated in response to LOAD 1 (again assuming that no intervening operation has caused this entry to be overwritten). Instead of outputting the physical register name of the physical register allocated to store the result of LOAD 1 (as was done for LOAD 2) however, memory file controller 202 may overwrite the physical register name 208 stored in that entry with the physical register name of the register containing the data being stored by STORE 1. Thus, when subsequent load operations hit in this entry, the memory file controller 202 will output the physical register name of STORE 1's source physical register instead of outputting the physical register name of LOAD 1's destination register.

Since memory file 132 is being used as a speculative structure, the accuracy of the information stored in memory file storage 204 may not be critical to the correct operation of microprocessor 100 (e.g., mispredictions in memory file 132 may not cause errors in the output of microprocessor 100). However, it may be desirable to improve the accuracy of memory file 132 in order to increase the benefits provided by correctly linking the speculative results of load operations to values stored in physical registers and/or to decrease any performance penalties incurred for mispredicted speculative links. In some embodiments, the accuracy of memory file 132 may be increased by invalidating entries in memory file storage 204 when updates to registers used to specify addresses are detected. For example, each addressing pattern may include one or more logical register identifiers used to identify a base and an index for address calculation. If a subsequent operation modifies one of the logical registers specified as part of an entry's addressing patter 206, that entry may be invalidated. Thus, logical register names of the destination register of each operation may be input to memory file 132 in order to perform entry invalidations, as shown in FIG. 2A.

Additionally, in some embodiments, entries within memory file storage 204 may be invalidated in response to snooping another device gaining write access to data at a particular address. Similarly, an entry may be invalidated in response to detection of a misprediction. Generally, many conditions such as these that may affect the accuracy of the entries in the memory file storage 204 may be monitored and used to determine when to invalidate entries. However, since memory file 132 is a speculative structure, some embodiments may not implement some of these monitoring methods if the additional hardware cost to implement certain monitoring methods outweighs the potential improvement in memory file accuracy.

Note that memory file 132 allows dependencies between operations that are relatively removed from each other in the operation stream to be used to link register values to speculative load results. Thus, a memory file may provide a dependency history between operations that may be separated by several intervening operations.

Figure 3:
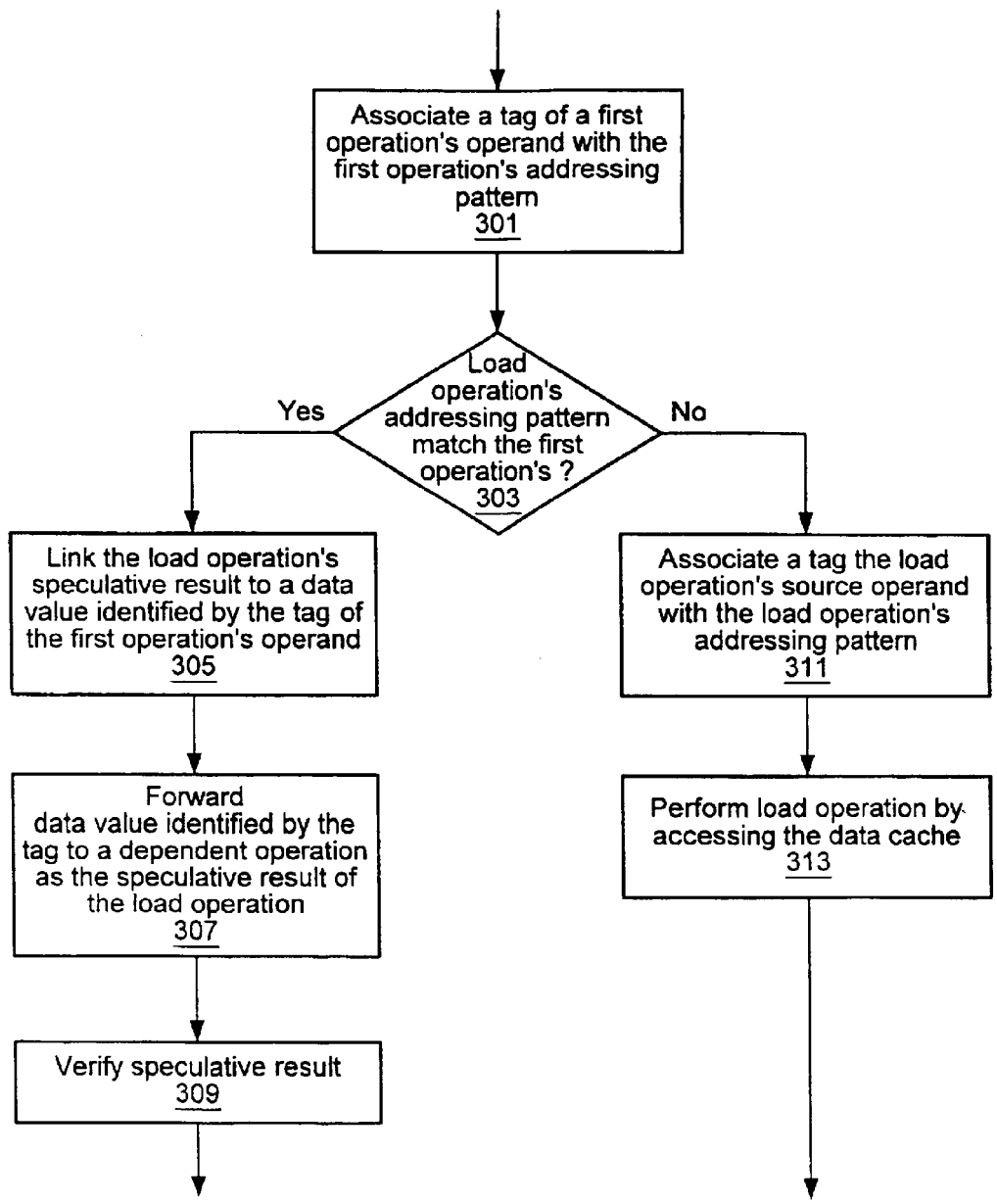
FIG. 3 is a flowchart showing one embodiment of a method of linking the speculative result of a load operation to a data value identified by a particular tag.

FIG. 3 shows a flowchart of one embodiment of a method of linking the speculative result of a load operation to a register value. At 301, a tag is associated with an addressing pattern, indicating that both are likely to store the same data value. Both the tag and the addressing pattern are specified for a first load or store operation. For example, if the first operation is a load operation, the tag may identify the physical register allocated to store the result of the load and the addressing pattern may be the used to calculate the address for the load. If instead the first operation is a store operation, the addressing pattern may indicate the address of the store's destination and the tag may identify the data being stored by the store operation. In some embodiments, the tag and the addressing pattern may be associated by storing both in an entry in a memory file.

If a load operation's addressing pattern matches the addressing pattern of the first operation, the load's speculative result may be linked to the data value identified by the tag specified for the first operation, as indicated at 303–305. If the load operation's addressing pattern does not match that of the first operation, the load's addressing pattern and the tag for the load's destination may be associated (e.g., by storing both in an entry in a memory file), as indicated at 303–311. Furthermore, the load may be performed normally by accessing the data cache, as shown at 313. In one embodiment, the load operation's addressing pattern may be compared to more than one prior operation's addressing pattern. For example, the load's addressing pattern may be compared to each addressing pattern currently stored in a memory file.

If the load's speculative result is linked to a data value identified by the tag, that data value may be forwarded to one or more dependent operations as the speculative result of the load operation, as indicated at 307. The data value may be forwarded through result forwarding or by forwarding an indication that dependent operations may use the data value as a speculative operand source, as will be described in more detail below. In one embodiment, if the data value is forwarded via result forwarding, dependent operations may be executed using the forwarded data value one cycle after an operation that generates the data value completes execution. If the data value is forwarded via an indication that dependent operations may use the physical register as a speculative operand source, dependent operations may be issued as soon as the operation that generates the data value completes execution. The speculative result may be forwarded before the speculative result is verified, as indicated at 309. The speculative result may be forwarded without accessing the data cache (i.e., the speculative result may be forwarded sooner than the non-speculative result, which is generated by accessing the data cache).

If the speculative result is verified to be correct at 309, the load operation may be completed without performing a data cache access. However, if the speculative result is determined to be incorrect at 309, the data cache access may be performed in order to obtain the correct result (not shown). If so, any dependent operations that executed using the speculative result of the load may be reexecuted using the load's correct result. Note that in some situations, the verification (at 309) may be performed before the linked data value is forwarded as the speculative result of the load (at 307). In such situations, the load may be performed normally or, if the link is determined to be correct, the data value may be forwarded as the non-speculative result of the load operation.

Various embodiments may link a load operation's speculative result to a register data value in many different ways.

In some embodiments, values may be linked by identifying two sources for an operand: a speculative source and a non-speculative source. The speculative source may be the linked data value. Speculative sources may be provided for load operations to indicate the data value linked to the speculative result of the load. In some embodiments, speculative sources may also be provided for operations dependent on such a load operation. Accordingly, some operands may have two tags: one identifying the speculative source and one identifying the non-speculative source. In such embodiments, each scheduler 118 may provide tag storage for both the speculative operand and the non-speculative operand, as shown in FIG. 4.

Figure 4:
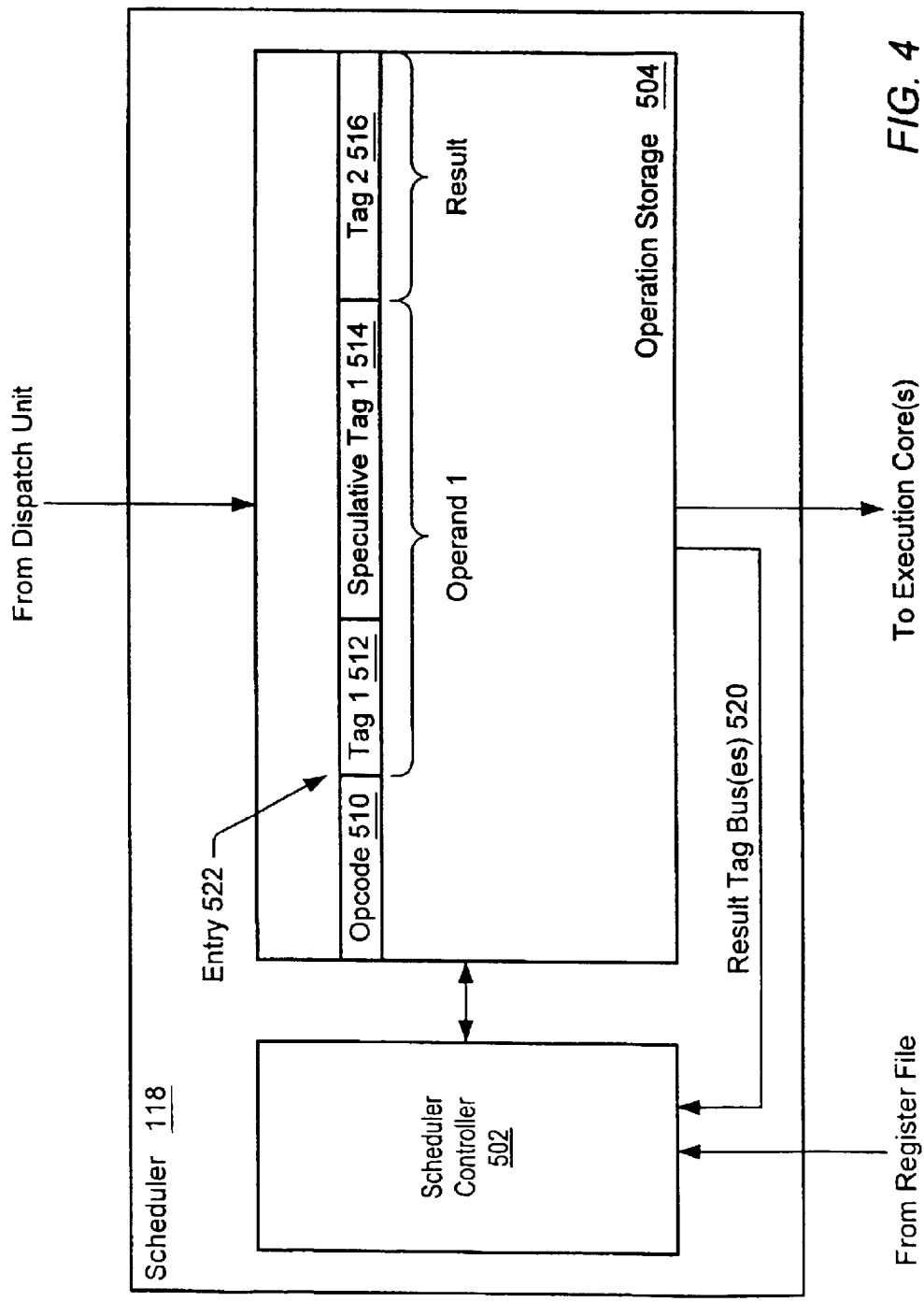
FIG. 4 is a block diagram of one embodiment of a scheduler.

FIG. 4 shows one embodiment of a scheduler 118 that may be included in a microprocessor. In the illustrated embodiment, the scheduler 118 includes a scheduler controller 502 and an operation storage 504. In response to dispatch unit dispatching an operation, scheduler controller 502 may allocate an entry within operation storage 504 to store information corresponding to the operation. For example, an entry 522 in operation storage 504 may include an opcode field 510, one or more operand fields, and a result field 516. The result field 516 may store a tag identifying the physical register in which the result of that entry's operation should be stored. When the operation is issued, this tag may be forwarded to each scheduler 118 on one of one or more tag buses 520. Each scheduler may compare the tags forwarded on tag buses 520 to the operand tags (both speculative and non-speculative, as described below) for pending operations in order to determine when the pending operations' operands will be available. Accordingly, an operation may be issued (or marked as being ready to issue) in response to its source operand tags appearing on tag bus 520.

Each operand field(s) may include storage for a speculative tag identifying a speculative operand source and a non-speculative tag identifying a non-speculative operand source. In the illustrated entry 522, operand 1's two sources are identified by non-speculative tag 512 and speculative tag 514. The scheduler 118 may be configured to issue an operation in response to one or more indications that the operation's operands are available. An operand is available if it is available from either a speculative source or a non-speculative source. If an operand is available from both a speculative source and a non-speculative source, the operation may be executed using the value available from the non-speculative source. In some embodiments, the scheduler 118 may prioritize issuing operations whose non-speculative operand sources are available over operations for which only speculative operand sources are available.

Note that an operation may include some operands that have speculative sources and other operands that do not have speculative sources. Also note that the same source may be a speculative source for one operation and a non-speculative source for another. In some embodiments, when an operation is executed, only one data value may be read for each operand (e.g., the execution core 124 may read either the speculative operand source or the non-speculative operand source, but not both). This may make it unnecessary to add additional ports into the register file 116. Speculative sources and physical sources may be stored in the same storage locations (e.g., within register file 116) and speculative sources may not be flagged or otherwise identified as speculative sources in some embodiments.

In many embodiments, scheduler 118 may be configured to keep entries allocated to operations after those operations have been issued to execution core(s) 124. When an operation is issued by scheduler 118 in response to the availability of one or more speculative operands, the scheduler may keep an entry 522 allocated to that operation so that the operation can be reissued if the speculative link is incorrect. In some embodiments, the load/store unit may be configured to verify speculative links that arise when a speculative load result is linked to a data value stored in a physical register. If the link is correct, the load store unit may be configured to not broadcast a non-speculative result of the load, since the correct result is already available through the link. If so, the scheduler(s) 118 may be configured to reissue an operation if a tag identifying a non-speculative operand source for that operation is broadcast on result bus 130.

Alternatively, the load/store unit may broadcast the result of the store along with an extra status bit that masks the broadcast or indicates that the speculative link was correct and that the load should not be reissued. However, if the speculative link is incorrect, the load/store unit may perform a data cache and/or memory access in order to obtain the correct result for the load and broadcast the result of the load. In embodiments where results are always broadcast, the additional status bit may indicate that the speculative link was incorrect. Thus, in many embodiments, the same tag and result buses already available in a microprocessor may be used to indicate that a speculative link is incorrect. In other embodiments, alternative indication mechanisms (e.g., using separate result buses 130 and/or result tag buses 520 to indicate mispredictions) may be implemented.

Figure 5:
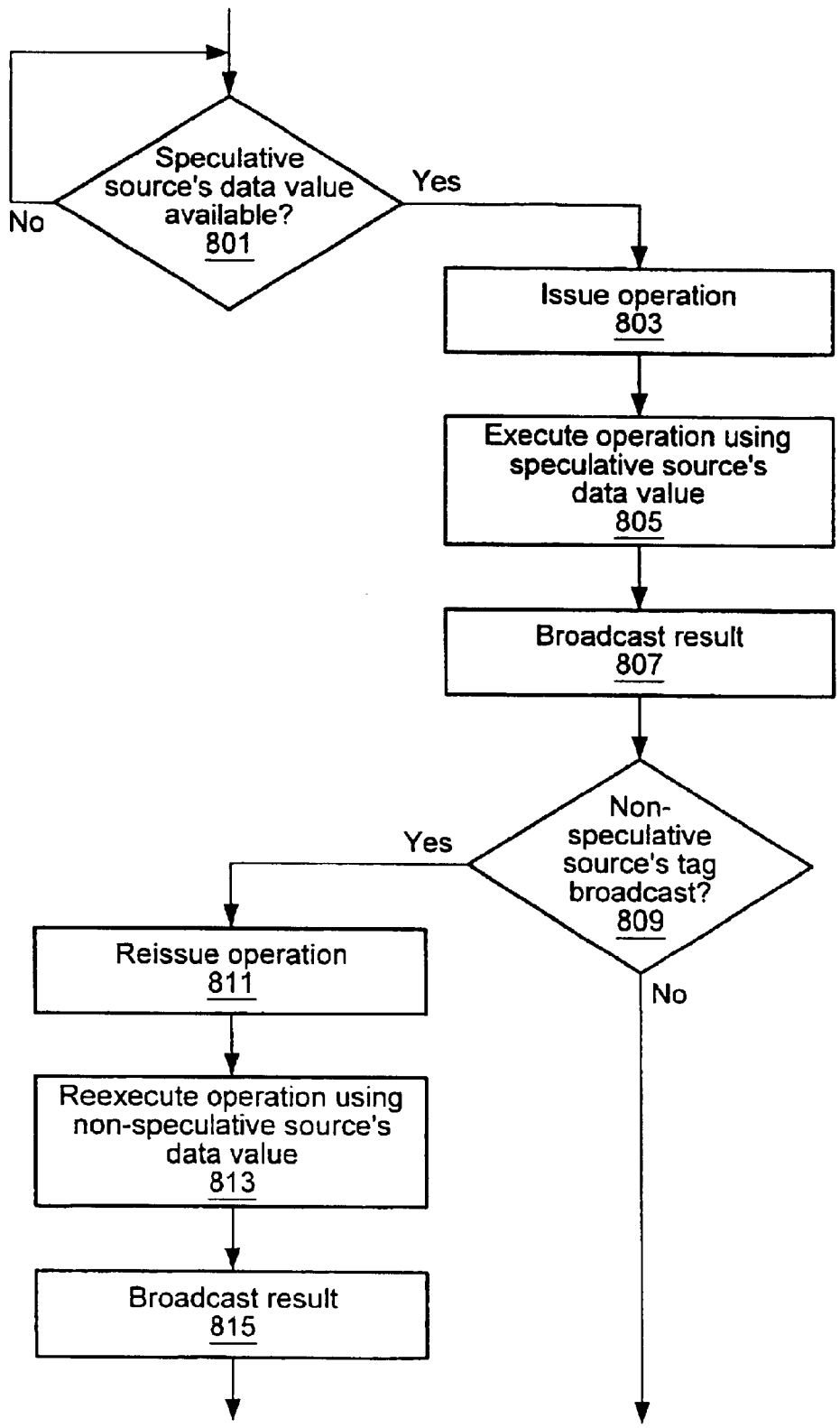
FIG. 5 is a flowchart of one embodiment of a method of issuing operations and reissuing operations in response to an indication that data speculation was incorrect.

FIG. 5 shows a flowchart of one embodiment of a method of issuing and reissuing operations that have both speculative and non-speculative operand sources. If an operation's speculative operand source is available, the operation may be issued, as shown at 801–803. An operation's speculative operand source may become available when a data value is present in a particular register within the register file or when the data value is output on the result bus. Note that in some situations, the operation's non-speculative operand source for the same operand may be available before the speculative operand source. In those situations, the operation may be issued before the speculative operand source becomes available. Subsequent availability of the speculative source may not trigger reissue of the operation in some embodiments.

The issued operation may be executed using the data value provided by the speculative operand source, as indicated at 805, and the result of the operation may be broadcast, as indicated at 807. Broadcasting the operation's result allows dependent operations to execute.

If at some later time the speculative source is determined to be incorrect (e.g., the data value provided by the speculative source and the non-speculative source are not the same, or a speculative link used to generate the tag of the speculative source is not correct), the tag of the non-speculative source may be broadcast as an indication that the speculative source's value is incorrect. Broadcasting the tag of the non-speculative source involves broadcasting the tag in such a way that the scheduler(s) respond by reissuing the operation. For example, in some embodiments, a scheduler may respond if the tag is broadcast and a status flag associated with the tag is set to a certain value, while in other embodiments there may not be an associated status flag and a scheduler may be configured to reissue an operation any time the non-speculative tag is broadcast.

Figure 6:
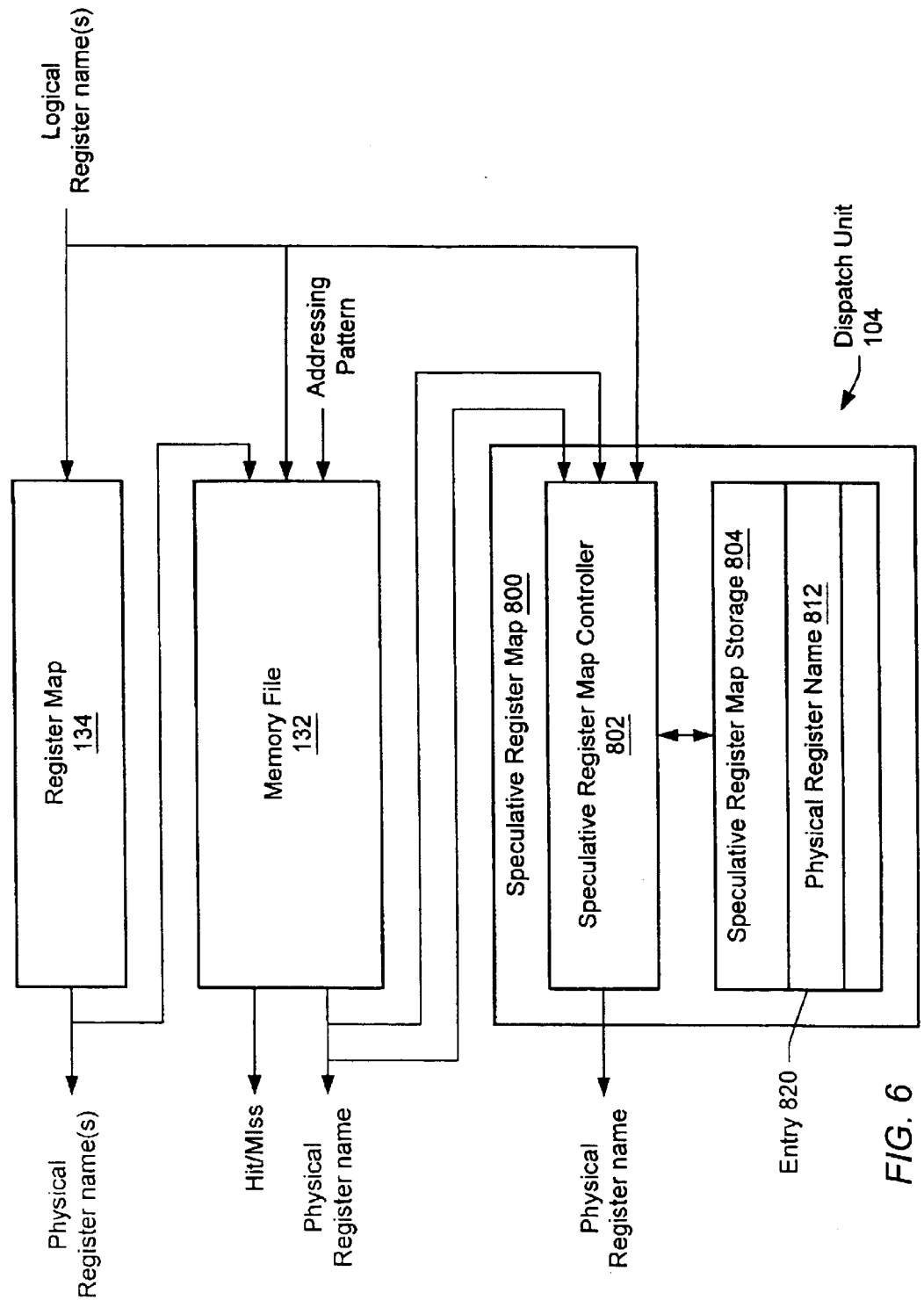
FIG. 6 is a block diagram of another embodiment of a dispatch unit.
Figure 7:
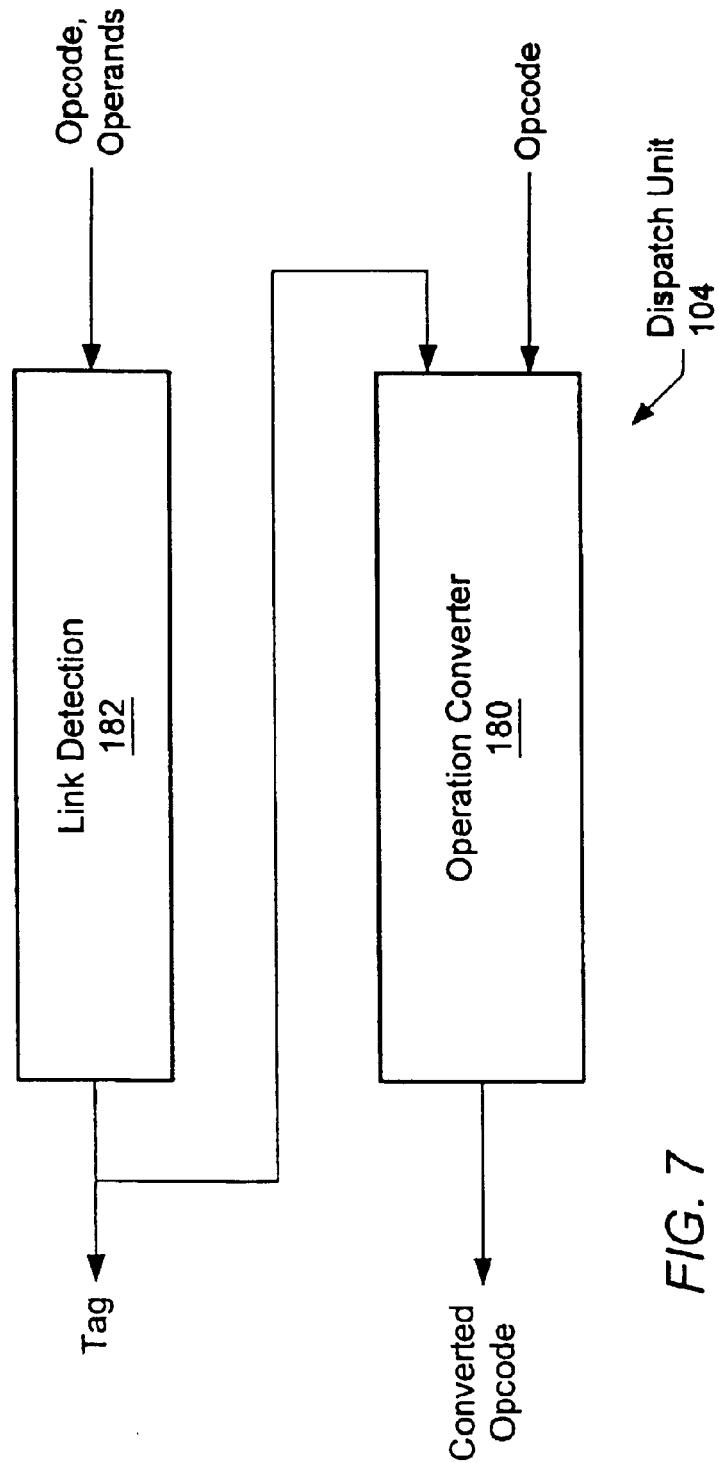
FIG. 7 is a block diagram of yet another embodiment of a dispatch unit.

FIG. 6 shows another embodiment of a dispatch unit 104 that may be included in a microprocessor 100. In this embodiment, dispatch unit 104 includes a register map 134, a memory file 132, and a speculative register map 800. Like register map 134, speculative register map 800 may translate logical register names to physical register names. However, speculative register map 800 may speculatively map a logical register name to a physical register name (e.g., in response to memory file 132 linking a value stored in a physical register to a speculative result of a load operation). The speculative register map 800 may allow speculative operand values for operations that do not include addressing patterns to be linked to register data values. For example, if there is a valid speculative map for logical register EAX, an operation having EAX as a source operand may have two source tags: a non-speculative tag provided by register map 134 and a speculative tag provided by speculative register map 800. Since the operation may issue as soon as its speculative source is available, speculative register map 800 may link data consumers directly to data producers via a speculative operand tag, bypassing any intervening loads and stores. Note that while the speculative map may store tags other than physical register names in some embodiments (e.g., in embodiments having a reorder buffer that includes storage for speculative register states).

Speculative register map 800 includes a speculative register map controller 802 and speculative register map storage 804. Speculative register map storage may include one or more entries 820. Each entry 820 may be associated with a particular logical register and indicate a physical register identifier 812 of the physical register to which that logical register is currently speculatively mapped. Each speculative register map entry 820 may also include an indication (not shown) as to whether that entry is currently valid or not. In one embodiment, speculative register map storage 804 may include an entry for each logical register. In other embodiments, speculative register map 804 may include fewer entries than there are logical registers. In such embodiments, each entry 820 may include an indication of the logical register to which that entry currently corresponds.

Speculative register map controller 802 may be configured to update an entry 820 in response to an indication that a load operation's speculative result has been linked with a data value identified by a particular physical register name. In the illustrated embodiment, this indication is provided by the memory file 132. The entry 820 to update is the entry for the logical register specified as the destination of the load operation. The entry may be updated to include the physical register identifier output by the memory file 132 for that load operation. In other embodiments, speculative register map entries may be created in response to indications other than those provided by a memory file 132 (in some of these embodiments, dispatch unit 104 may not include a memory file). For example, dispatch unit 104 may detect a conditional move instruction CMOV EAX, EBX if Z and responsively indicate that the speculative register map entry for EAX should identify the physical register currently mapped to EBX. Generally, speculative register map entries may be created in response to any prediction mechanism that indicates that a logical register should be speculatively mapped to a particular physical register.

In some embodiments, operations may be provided to speculative register map 800 during the same cycle that they are provided to register map 134. As register map 134 performs the non-speculative register renaming for an operation, speculative register map 800 may indicate whether any of the logical registers specified as storing one of the operation's speculative source operands are linked to a particular physical register. If a valid entry exists in speculative register map storage 804 for one of the operation's logical register sources, speculative register map controller 802 may output the physical register name stored in that logical register's entry. Dispatch unit 104 may output this speculative physical register name as a speculative source when the operation is dispatched to a scheduler 118. Thus, if an ADD operation is provided to speculative register map 800 and one of the ADD's sources has a valid entry in speculative register map storage 804, the tag for the physical register identified in that entry may be provided as a speculative source operand tag to scheduler 118. The scheduler may be configured to store both speculative and non-speculative operand tags, as described above, and may in some embodiments be configured to reissue operations (if already issued) in response to the non-speculative tag being broadcast on a result bus.

Entries within the speculative map may be invalidated in response to an indication that a data value for a particular logical register will be modified. For example, if an operation ADD EAX, ECX is handled by the dispatch unit 104, the speculative register map controller 802 may invalidate the speculative map entry currently assigned to EAX since the ADD operation will modify that register value.

Generally, speculative operand tags may be provided to scheduler 118 whenever one operation's speculative result is linked to a register data value. In some embodiments, a memory file 132 and other structure that tracks dependencies over several cycles (e.g., a speculative register map as described below) may be used to link speculative results to register values. For example, dispatch unit 104 may generate speculative tags for an operation in response to a memory file 132 identifying a link. In some embodiments, speculative tags may be generated without the use of such a speculative map. For example, a sequence of instructions may include:

| ADD EBX, EBX | (ADD 1), |
| MOV [addressing pattern A], EBX | (STORE 1) |
| ADD [addressing pattern A], ECX | (ADD 2). |

These instructions may be contiguous instructions (e.g., they may directly follow each other in program order). These instructions may be separated into the following component operations (shown with logical addresses translated to physical addresses) for execution within execution core(s) 124:

| ADD PR2, PR2, PR1 | (ADD 1) |
| MOV [addressing pattern A], PR2 | (STORE 1) |
| MOV PR3, [addressing pattern A] | (load for ADD 2) |
| ADD PR4, PR3, PR5 | (add for ADD 2) |
| MOV [addressing pattern A], PR4 | (store for ADD 2) |

Before the component load, add, and store operations of ADD 2 are dispatched, a dispatch unit 104 may detect whether there are any dependencies between any of the component operations in the sequence that would allow linking to speculative results. Additionally, the data being stored by STORE 1 may be linked to the load's speculative result (e.g., by a memory file). Since there are no intervening operations, dispatch unit may have all of the information needed to detect a dependency between the load operation and the add operation (both operations being derived from the same instruction) in the same dispatch cycle. Based on these two dependencies, the dispatch unit 104 may link the tag of the data being stored by STORE 1, PR2, to the speculative result of the load operation performed as part of ADD 2. This speculative link may in turn allow the dispatch unit to link the source of the addition operation performed as part of ADD 2 to the value stored in PR2. Accordingly, dispatch unit may output an indication that PR2 may be speculatively used as the source of one of the operands for the addition but that PR3 is the non-speculative source for that operand. Thus, in one embodiment, the operations and operand identifiers output by dispatch unit may be specified as follows:

| | |
|---|---|
| ADD PR2, PR2, PR1 | (ADD 1) |
| MOV [addressing pattern A], PR2 | (STORE 1) |
| MOV PR3, [addressing pattern A] | (load for ADD 2) |
| ADD PR4, PR2*, PR3, PR5 | (add for ADD 2, where PR2* is a speculative source for ECX and PR3 is the non-speculative source for ECX) |
| MOV [addressing pattern A], PR4 | (store for ADD 2). |

In other embodiments, dispatch unit 104 may not be configured to identify speculative source operands for operations that depend on a load operation. Instead, dispatch unit 104 may include an operation converter 180 configured to convert load operations into one or more operations that include a register-to-register move operation in order to provide speculative load results to dependent operations. The conversion of a load operation may be performed in response to an indication that a link exists between a speculative result of the load operation and a data value identified by a particular physical register name. This indication is provided by the link detector 182, which may include a memory file 132 in some embodiments. In other embodiments, the link detector 182 may include logic configured to link data values in response to operations such as a conditional move operation, as described above.

In one embodiment, the operation converter may receive an input opcode for an operation as well as an indication as to whether a link between a register value and a speculative result of the operation is detected for that operation. If the operation is a load and a speculative link has been detected, the operation converter may output an opcode for a register-to-register move operation. The dispatch unit 104 may dispatch the register-to-register move operation, using the tag output by the link detection unit as the source operand tag for the register-to-register move.

In some embodiments, the operation converter may be configured to dispatch the resulting register-to-register move such that the scheduler stores the operand tags needed for both the register-to-register move and the original load operation in the entry allocated to the register-to-register move operation. This may allow the operation to be reissued as the original load operation if the speculative result of the register-to-register move operation is detected to be incorrect. In order to implement this, an additional source operand may be added to each register-to-register move operation that results from modifying a load operation (or, in alternative embodiments, a source operand that is already present may be modified to implement this). In some embodiments, the speculative result of the register-to-register move operation may be verified by performing the address calculation for the original load and/or comparing the linked data value to the actual load result data value. If the speculative result is incorrect, the data cache may be accessed in order to obtain the correct load result. Rebroadcast of the correct load result may cause the scheduler to reissue any dependent operations that were executed using the incorrect value.

In some embodiments, the operation converter 180 may be configured to convert a load operation into a dual-nature operation. Like a load operation, this dual-nature operation may involve both address calculation and data movement. Unlike a load, the data movement initiated by the dual-nature operation is a register-register move. Furthermore, the data movement initiated by the dual-nature operation may occur before the address calculation has completed. The address calculation may be used to verify whether the speculative link was correct. If the speculative link was incorrect, the dual-purpose operation may be reissued as a normal load operation and its result may be rebroadcast to dependent operations upon completion of a data cache access.

The following examples show how different embodiments may convert this exemplary sequence of operations:

| | |
|---|---|
| ADD PR2, PR1, PR1 | (ADD 1) |
| ... | |
| STORE [addressing pattern A], PR2 | (STORE 1) |
| ... | |
| LOAD PR3, [addressing pattern A] | (LOAD 1) |
| ... | |
| ADD PR4, PR3, PR3 | (ADD 2) |

In this sequence, it is possible that the specified operations may be separated by one or more intervening operations. However, assuming that no intervening operations appear to modify the values used in addressing pattern A or to modify the data values stored at the address calculated from addressing pattern A and in PR2, a speculative link may be detected between the data values stored in PR2 and at the address calculated from addressing pattern A.

In one embodiment, in response to the detection of the speculative link by speculative link detector 182, operation converter 180 may convert LOAD 1 into a dual-purpose move operation: MOV PR3, PR2. In addition to specifying the register source and destination, this dual-purpose move operation may also specify addressing pattern A so that the address calculation for LOAD 1 may be performed. However, the move portion of the dual-purpose move operation may issue as soon as ECX is available. As soon as the result of the move portion of the dual-portion operation is broadcast, ADD 2 may issue, using the speculative result of the move operation as an operand. When the address calculation is performed, the speculative link may be verified. If the speculative link is incorrect, the load/store unit may provide an indication to the scheduler that causes the scheduler to reissue the dual-purpose move operation as a load operation. The result of the load operation may be broadcast, causing any dependent operations, such as ADD 2, which may have executed using the speculative result of the move to reissue. Note that this dual-purpose operation may be scheduled using a single scheduler entry and that a scheduler 118 may select the dual-purpose operation for issue twice: once for the load's address calculation and once for the register-to-register move.

In an alternative embodiment, operation converter 180 may convert LOAD 1 into two linked operations, LOAD PR3, [addressing pattern A] and MOV PR3, PR2, in response to detection of the speculative link. Unlike the earlier example, which involved a dual-purpose operation, these linked operations may each take up an entry in a scheduler 118 instead of sharing a single scheduler entry. When the register-to-register move operation issues, dependent operations such as ADD 2 may issue using the speculative value of PR3 as an operand value. The LOAD operation may be tagged as a special type of load operation so that, if the speculative link is determined to be correct, the load's result tag is not broadcast (or is broadcast with an indication that the move's result is correct and that the dependent operations should not reissue). Also, if both the load and the move operation broadcast their results on the same cycle, an indication may be provided so that the load result is used for dependent operations instead of the move result. In some embodiments, this may occur by adding an extra bit to each tag bus within the microprocessor 100 that indicates to which tag a scheduler should respond. If the speculative link is incorrect (e.g., as indicated by the broadcast of the load's result tag), the move operation may be cancelled (e.g., the scheduler 118 that schedules the move operation may deallocate the scheduler entry currently allocated to the register-to-register move so that the operation cannot reissue). In many embodiments, the scheduler may be configured to reissue any dependent operations that executed using the speculative load result in response to the load result tag reappearing on the result bus.

Figure 8:
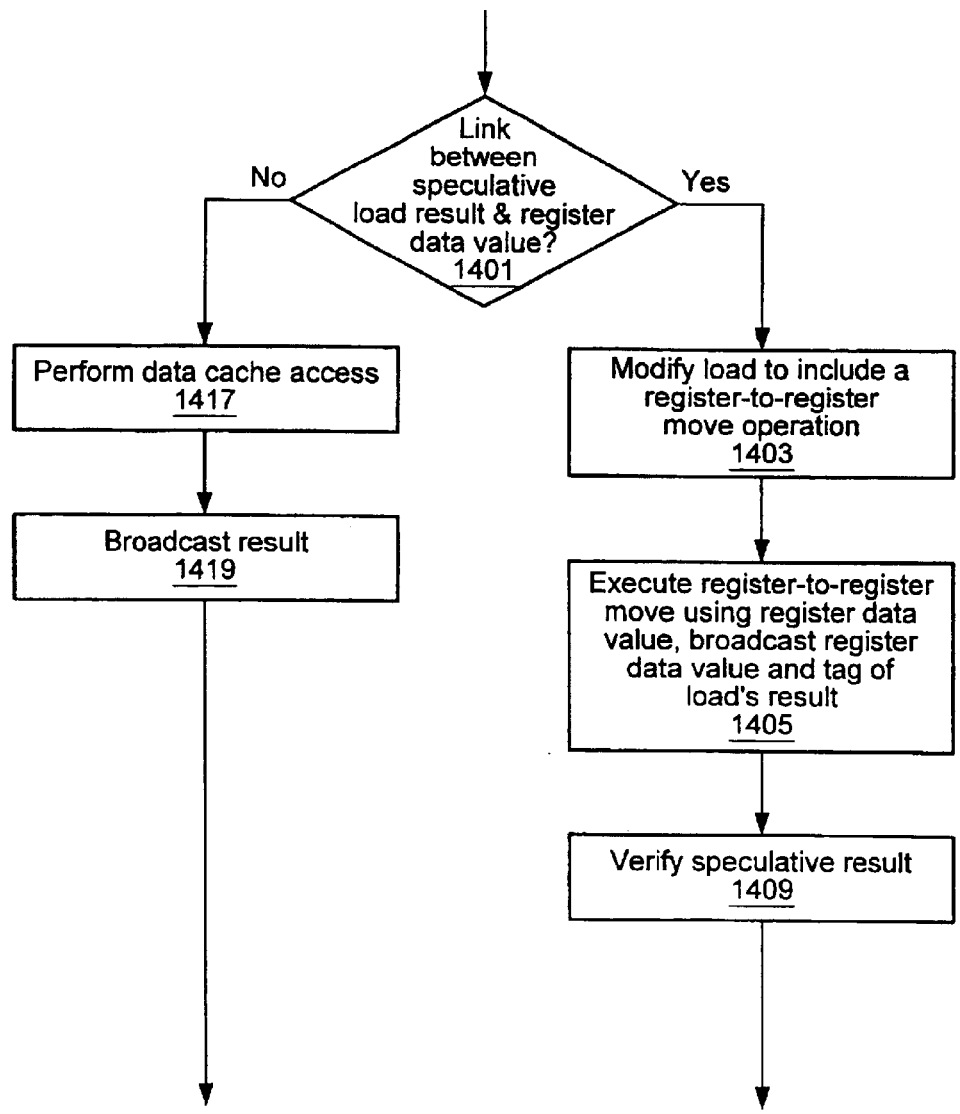
FIG. 8 is a flowchart showing another method of issuing operations with speculative data values and recovering from mispredictions.

FIG. 8 illustrates one embodiment of a method of converting load operations to include a speculative register-to-register move operation. As shown, if a link between a register data value identified by a particular tag and a speculative result of a load operation is detected (e.g., by a memory file) at 1401, the load operation may be modified to include a register-to-register move operation having a source operand tag equal to the tag of the data value linked to the speculative load result, as shown at 1403. Execution of the register-to-register move operation may involve outputting the data value identified by the tag onto the result bus along with the tag of the load's result at 1405.

The speculative result may be verified (e.g., by performing the address calculation for the original load) at 1409. If the speculative result is correct, the load's result may not be rebroadcast on the result bus (or, alternatively, the load's result may be rebroadcast along with an indication that dependent operations should not reissue in response to the rebroadcast result). If the speculative result is incorrect, the data cache may be accessed to retrieve the correct load result and the correct load result may be broadcast on the result bus. This may in turn cause any dependent operations that issued using the speculative result value to be reissued. Note that in some situations, the speculative result may be verified before performance of the register-to-register move operation. If the speculative result is incorrect, the register-to-register move operation may not be performed.

If no link between the speculative result of the load operation and a register data value is detected (e.g., the load's addressing pattern misses in a memory file), the load may not be modified. The load may execute normally, accessing the data cache and broadcasting its result on the result bus, as shown at 1417 and 1419.

Figure 9:
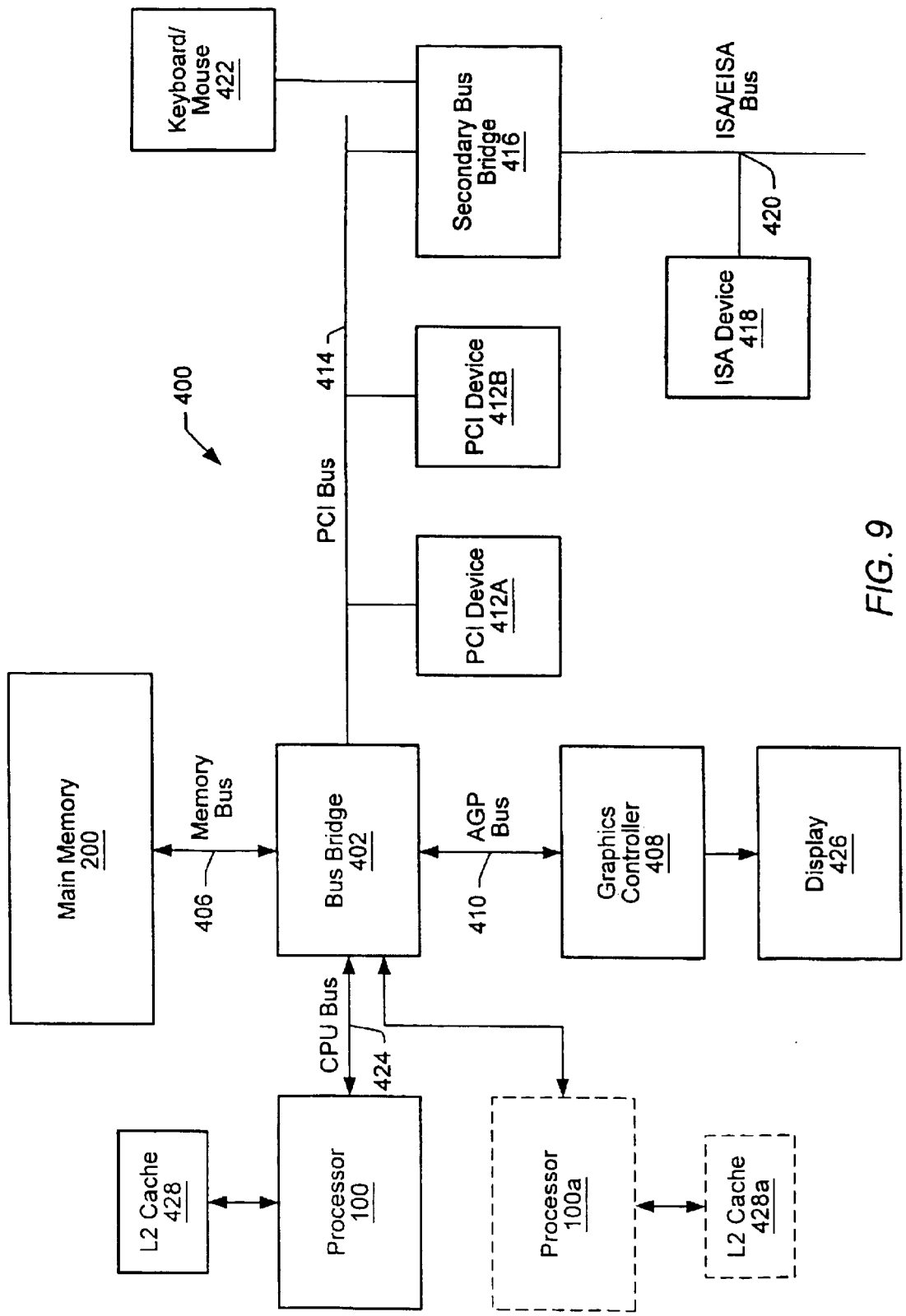
FIG. 9 shows one embodiment of a computer system.

FIG. 9 shows a block diagram of one embodiment of a computer system 400 that includes a processor 100 coupled to a variety of system components through a bus bridge 402. Processor 100 may include an embodiment of a dispatch unit 104, a memory file 132, a scheduler 118, and/or speculative register map 800 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 100 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 comprises DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100*a* shown as an optional component of computer system 400). Processor 100*a* may be similar to processor 100. More particularly, processor 100*a* may be an identical copy of processor 100. Processor 100*a* may be connected to bus bridge 402 via an independent bus (as shown in FIG. 9) or may share CPU bus 224 with processor 100. Furthermore, processor 100*a* may be coupled to an optional L2 cache 428*a* similar to L2 cache 428.

Figure 10:
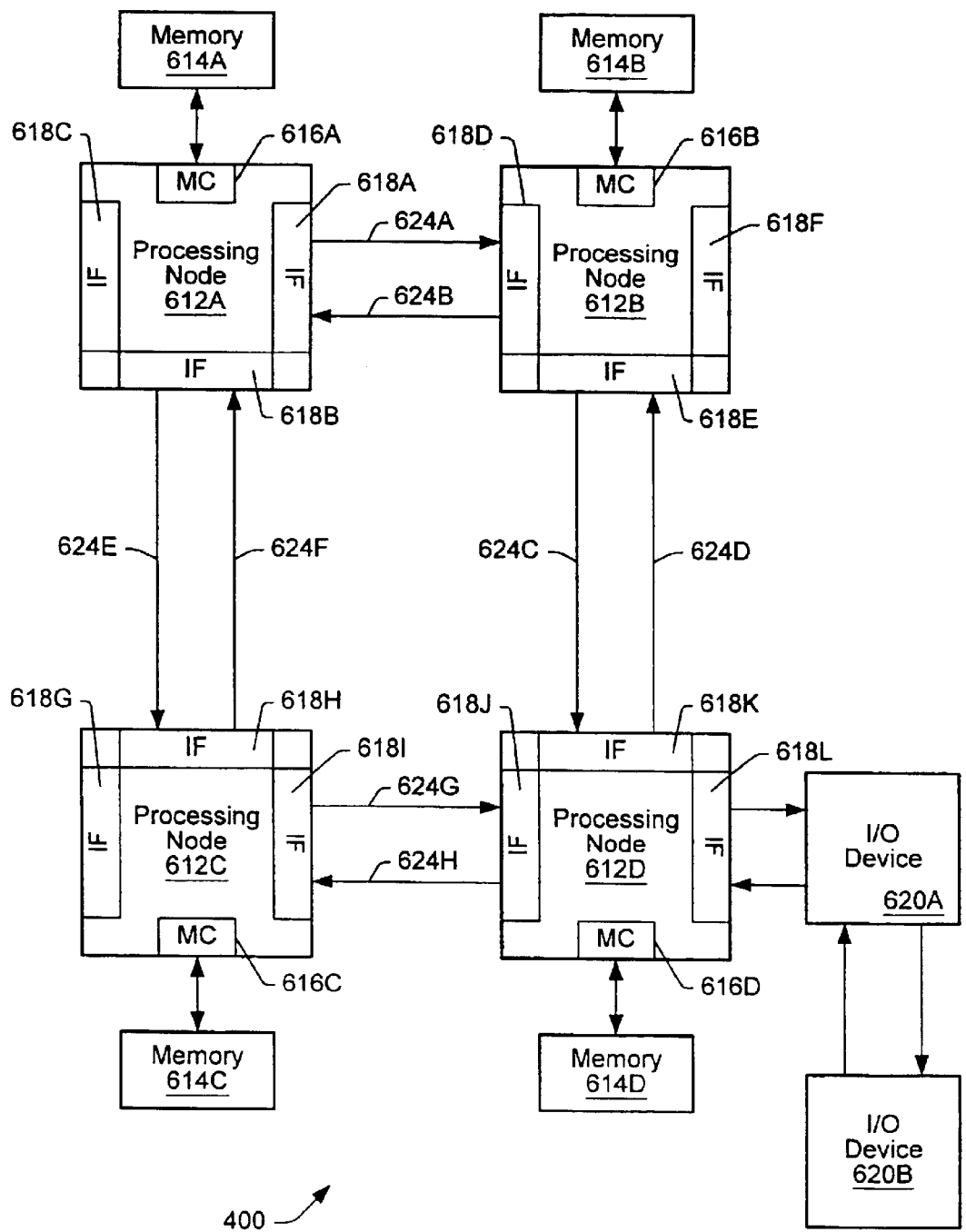
FIG. 10 shows another embodiment of a computer system.

Turning now to FIG. 10, another embodiment of a computer system 400 that may include a dispatch unit 104, a memory file 132, a scheduler 118, and/or speculative register map 800 as described above is shown. Other embodiments are possible and contemplated. In the embodiment of FIG. 10, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 10. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 10. Any suitable routing algorithm may be used Other embodiments of computer system 400 may include more or fewer processing nodes then the embodiment shown in FIG. 10.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more processors. Broadly speaking, a processing node comprises at least one processor and may optionally include a memory controller for communicating with a memory and other logic as desired. More particularly, each processing node 612A–612D may comprise one or more copies of processor 100. External interface unit 18 may includes the interface logic 618 within the node, as well as the memory controller 616.

Memories 614A–614D may comprise any suitable memory devices. For example, a memory 614A–614D may comprise one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may comprise control circuitry for interfacing to memories 614A–614D. Additionally, memory controllers 616A–616D may include request queues for queuing memory requests.

Interface logic 618A–618L may comprise a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A microprocessor comprising:
a scheduler including an entry allocated to an operation, wherein the entry includes a non-speculative tag and a speculative tag, wherein both the non-speculative tag and the speculative tag are associated with a first operand of the operation, wherein the scheduler is configured to issue the operation in response to a data value identified by the speculative tag being available;
an execution core coupled to the scheduler and configured to execute the operation using the data value identified by the speculative tag;
wherein the scheduler is configured to reissue the operation if the non-speculative tag appears on a result bus.

2. The microprocessor of claim 1, further comprising a dispatch unit including a register map and a speculative register map, wherein the register map outputs the non-speculative tag in response to receiving a logical register identifier of the first operand, and wherein the speculative register map outputs the speculative tag in response to receiving the logical register identifier of the first operand.

3. The microprocessor of claim 2, wherein the speculative register map is configured to associate the speculative tag with the first logical register identifier in response to an indication that a speculative result of a load operation is linked to a data value identified by the speculative tag, wherein a result of the load operation is identified by the first logical register identifier.

4. The microprocessor of claim 3, wherein the speculative register map is configured to disassociate the speculative tag from the first logical register identifier in response to an indication that the speculative result of the load operation is incorrectly linked to the data value identified by the speculative tag.

5. The microprocessor of claim 2, wherein the speculative register map is configured to disassociate the speculative tag from the first logical register identifier in response to an indication that a second operation will modify a data value identified by the first logical register identifier.

6. The microprocessor of claim 3, wherein the dispatch unit comprises a memory file configured to generate the indication that the speculative result of the load operation is linked to the data value identified by the speculative tag.

7. The microprocessor of claim 2, wherein the speculative register map is configured to associate the speculative tag with the first logical register identifier in response to an conditional move operation having a destination operand identified by the first logical register identifier and a source operand, wherein a current value of the source operand is identified by the speculative tag.

8. The microprocessor of claim 1, further comprising a dispatch unit configured to provide the speculative tag and the non-speculative tag to the scheduler in response to detecting a data dependency between operations included in a first instruction, wherein a first one of the operations is a load operation and a destination operand of the load operation is identified by the non-speculative tag, wherein the dispatch unit is further configured to detect a link between a speculative result of the load operation and a data value identified by the speculative tag, and wherein the operation is included in the operations included in the first instruction and is dependent on the load operation.

9. The microprocessor of claim 1, wherein the scheduler is configured to issue the operation in response to the data value identified by the speculative tag being available if no other unissued operations have all of their non-speculative operands available.

10. A microprocessor comprising:
a non-speculative register map configured to provide a non-speculative operand tag for a first source operand of an operation;
a speculative register map configured to provide a speculative operand tag for the first source operand of the operation;
a scheduler coupled to the speculative register map, wherein the scheduler includes an entry allocated to the operation, wherein the entry includes the speculative operand tag and the non-speculative operand tag for the operand, wherein the scheduler is configured to issue the operation for execution using the speculative operand tag.

11. The microprocessor of claim 10, wherein the first source operand is identified by a first logical register identifier, wherein the speculative operand tag identifies a first physical register, and wherein the non-speculative operand tag identifies a second physical register.

12. The microprocessor of claim 10, further comprising an execution core coupled to the scheduler and configured to execute the operation using a data value identified by the speculative operand tag.

13. The microprocessor of claim 10, wherein the scheduler is configured to reissue the operation in response to the non-speculative operand tag appearing on a result bus.

14. The microprocessor of claim 10, further comprising a memory file configured to detect a link between a speculative result of a load operation and a data value identified by the speculative operand tag, wherein a result of the load operation is identified by a first logical register identifier, wherein the speculative register map is configured to associate the first logical identifier and the speculative operand tag in response to the memory file detecting the link.

15. The microprocessor of claim 14, wherein the speculative register map is configured to disassociate the speculative operand tag from the first logical register identifier in response to an indication that the speculative result of the load operation is incorrectly linked to the data value identified by the speculative operand tag.

16. The microprocessor of claim 15, wherein the execution core is configured to generate the indication in response to performing an address calculation for the load operation.

17. The microprocessor of claim 10, wherein the speculative register map is configured to associate the speculative operand tag with the first logical register identifier in response to an conditional move operation having a destination operand identified by the first logical register identifier and a source operand, wherein a current value of the source operand is identified by the speculative operand tag.

18. The microprocessor of claim 10, wherein the speculative register map is configured to disassociate the speculative operand tag from the first logical register identifier in response to an indication that a second operation will modify a data value identified by the first logical register identifier.

19. A method comprising:
mapping a first source operand of an operation to a non-speculative operand tag;
speculatively mapping the first source operand of the operation to a speculative operand tag;
storing the non-speculative operand tag and the speculative operand tag in a scheduler entry allocated to the operation;
issuing the first operation in response to availability of a first data value identified by the speculative operand tag;

executing the first operation using the first data value identified by the speculative operand tag instead of using a second data value identified by the non-speculative operand tag.

20. The method of claim 19, wherein the first source operand is identified by a first logical register identifier, wherein the speculative operand tag identifies a first physical register, and wherein the non-speculative operand tag identifies a second physical register.

21. The method of claim 19, further comprising reissuing the operation in response to the non-speculative operand tag appearing on a result bus.

22. The method of claim 19, further comprising detecting a link between a speculative result of a load operation and a data value identified by the speculative operand tag, wherein the first source operand is generated as a result of the load operation, and associating the first source operand and the speculative operand tag in response to the detecting the link.

23. The method of claim 22, further comprising disassociating the speculative operand tag from the first source operand in response to an indication that the speculative result of the load operation is incorrectly linked to the data value identified by the speculative operand tag.

24. The method of claim 23, further comprising generating the indication in response to performing an address calculation for the load operation.

25. The method of claim 19, further comprising associating the speculative tag with the first source operand in response to a conditional move operation having a destination operand and a source operand, wherein a current value of the conditional move's source operand is identified by the speculative operand tag, and wherein the first source operand is the conditional move operation's destination operand.

26. The method of claim 19, further comprising disassociating the speculative operand tag from the first source operand in response to an indication that a second operation will modify the first source operand.

27. A method comprising:
   issuing an operation in response to availability of a first data value identified by a speculative operand tag;
   executing the operation using the first data value instead of using a second data value identified by a non-speculative operand tag;
   broadcasting the non-speculative operand tag on a result bus;
   in response to said broadcasting, reissuing the operation;
   in response to said reissuing, executing the operation using the second data value identified by the non-speculative operand tag.

28. The method of claim 27, further comprising associating the speculative tag with a first source operand of the operation in response to an indication that a speculative result of a load operation is linked to a data value identified by the speculative tag, wherein a result of the load operation is the first source operand.

29. The method of claim 28, further comprising disassociating the speculative tag from the first source operand in response to an indication that the speculative result of the load operation is incorrectly linked to the data value identified by the speculative tag.

30. The method of claim 28, further comprising disassociating the speculative tag from the first source operand in response to an indication that a second operation will modify the first source operand.

31. The method of claim 27, further comprising associating the speculative tag with the first source operand in response to an conditional move operation having a destination operand and a source operand, wherein a current value of the conditional move's source operand is identified by the speculative operand tag, and wherein the first source operand is the conditional move operation's destination operand.

32. The method of claim 27, further comprising:
   detecting a data dependency between operations included in a first instruction, the operations include the operation and a load operation, wherein a destination operand of the load operation is identified by the non-speculative operand tag, and wherein the operation is dependent on the load operation; and
   detecting a link between a speculative result of the load operation and a data value identified by the speculative operand lag.

33. A microprocessor comprising:
   a system memory; and
   a microprocessor coupled to the system memory, wherein the microprocessor includes:
      a scheduler including an entry allocated to an operation, wherein the entry includes a non-speculative tag and a speculative tag, wherein both the non-speculative tag and the speculative tag are associated with a first operand of the operation, wherein the scheduler is configured to issue the operation in response to a data value identified by the speculative tag being available; and
      an execution core coupled to the scheduler and configured to execute the operation using the data value identified by the speculative tag;
      wherein the scheduler is configured to reissue the operation if the non-speculative tag appears on a result bus.

* * * * *